Figure 1:
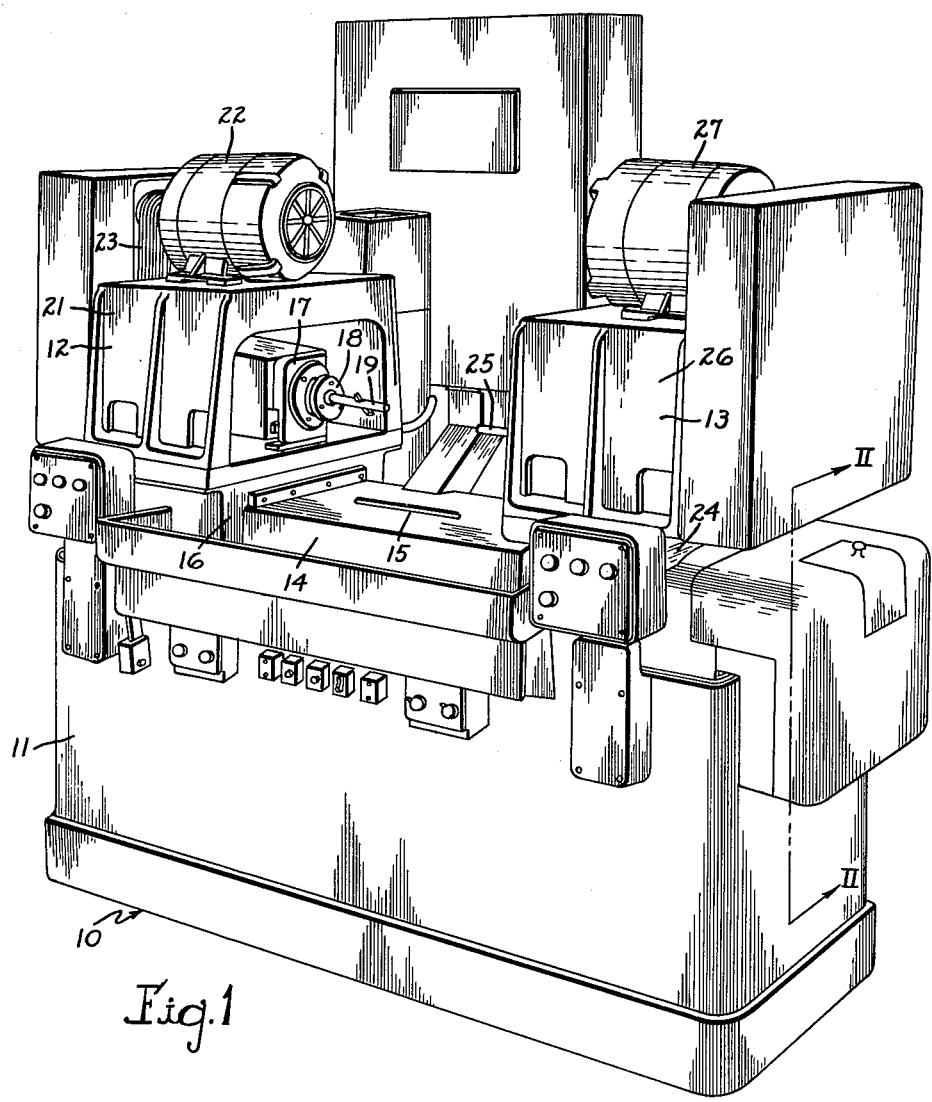

Nov. 30, 1965   A. H. JACOBSON ETAL   3,220,286
MACHINE TOOL
Filed March 29, 1963   5 Sheets-Sheet 1

INVENTORS
Alden H. Jacobson
Fred A. Anderson
BY Norman J. Blodgett
Attorney

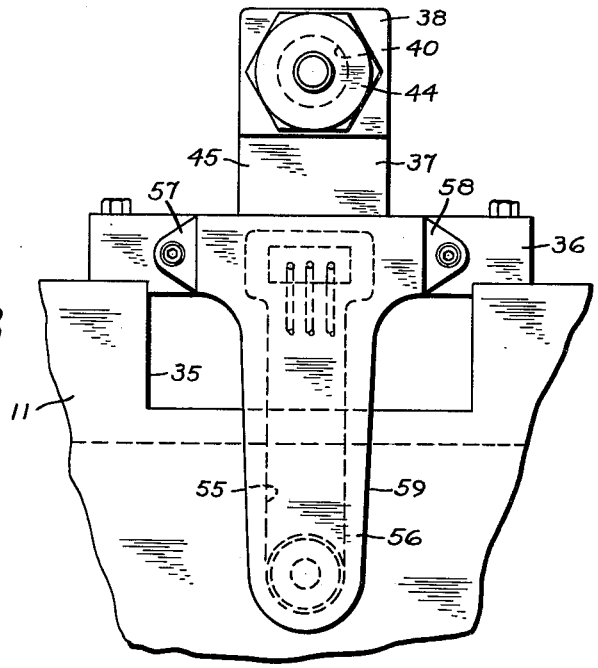
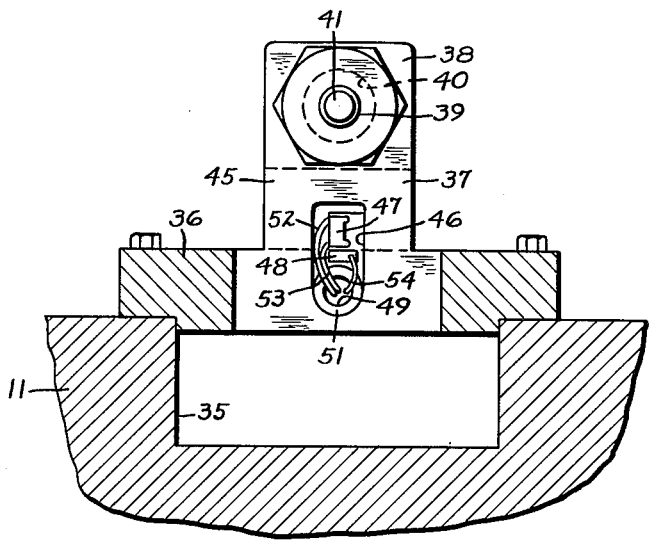

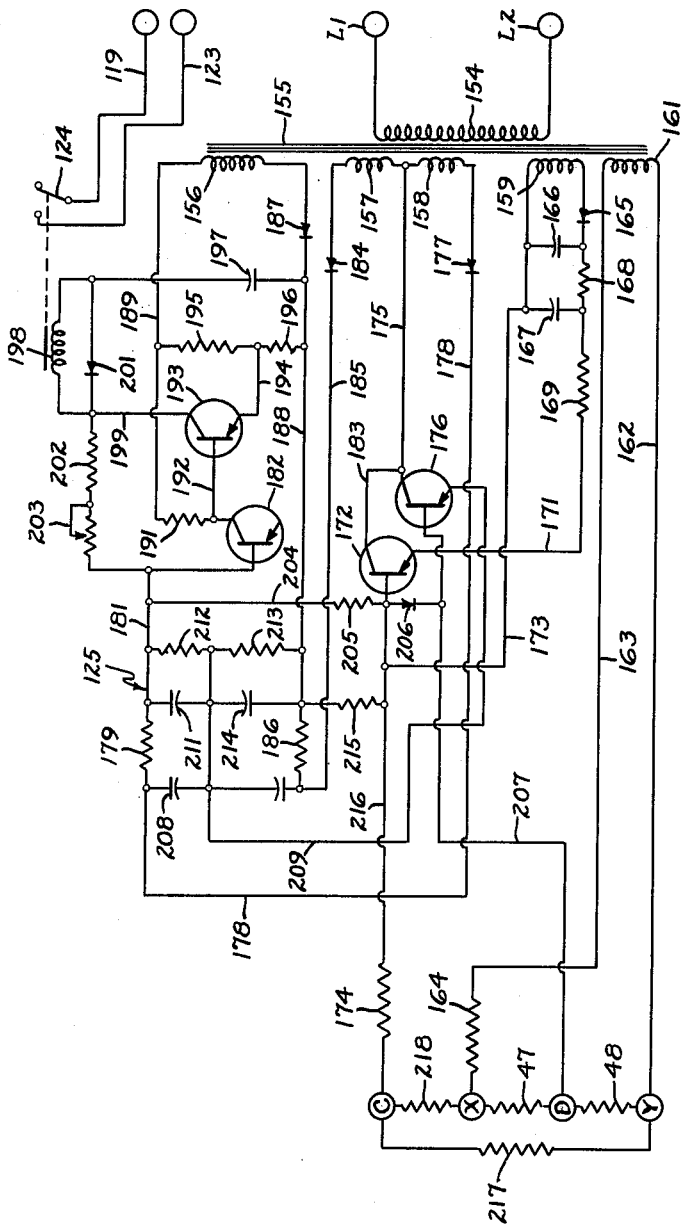

United States Patent Office 3,220,286
Patented Nov. 30, 1965

3,220,286
MACHINE TOOL
Alden H. Jacobson, Paxton, and Fred A. Anderson, Holden, Mass., assignors to The Heald Machine Company, Worcester, Mass., a corporation of Delaware
Filed Mar. 29, 1963, Ser. No. 268,969
4 Claims. (Cl. 77—3)

This invention relates to a machine tool and, more particularly, to apparatus arranged to generate a finished surface on a workpiece by means of a cutting tool.

In the machining of workpieces it is often necessary in operations such as boring that the relative axial movement between the tool and the workpiece be terminated at a very definite and accurately-determined point. In the past, this has been accomplished by the use of a limit switch which was connected to the drive of the machine tool in such a way as to produce a change in the driving relationship between the moving parts. However, not only is a conventional limit switch a poor instrument for this purpose (because of its poor repeatability of actuating point) but it is difficult to set its operating point accurately. Furthermore, a limit switch of this type does not provide a positive stop for the machine movement. The major difficulty experienced, however, in the use of limit switches is that a limit switch operating point cannot be definitely determined with the degree of accuracy necessary in some machine tool operations. These and other difficulties experienced with the prior art devices have been obviated in a novel manner by the present invention.

It is, therefore, an outstanding object of the invention to provide a machine apparatus having a movement-limiting device whose terminating point is repeatable with a high degree of accuracy.

Another object of this invention is the provision on a machine tool of a movement-limiting device which not only acts as a positive stop for machine feed movement but also gives an electrical signal indicative of relative position between the parts.

A further object of the present invention is the provision of a machine tool in which, at the end of the cutting tool movement, an electrical signal is derived which rises in value and which may be used to determine accurate relative positions of the cutting tool by measurement of the value of the electrical signal.

It is another object of the instant invention to provide a machine tool in which the terminating point of the cutting tool movement may be determined with a high degree of accuracy and may be adjusted, from time to time.

It is a further object of the invention to provide a machine tool containing a motion-terminating apparatus which is simple in construction, inexpensive to manufacture, and which is capable of a long life of useful service with a minimum of difficulty in maintenance.

A still further object of this invention is the provision of a machine tool in which apparatus is provided for a very accurate determination of the relative positions of the tool and workpiece.

With these and other objects in view, as will be apparent to those skilled in the art, the invention resides in the combination of parts set forth in the specification and covered by the claims appended hereto.

Figure 2:
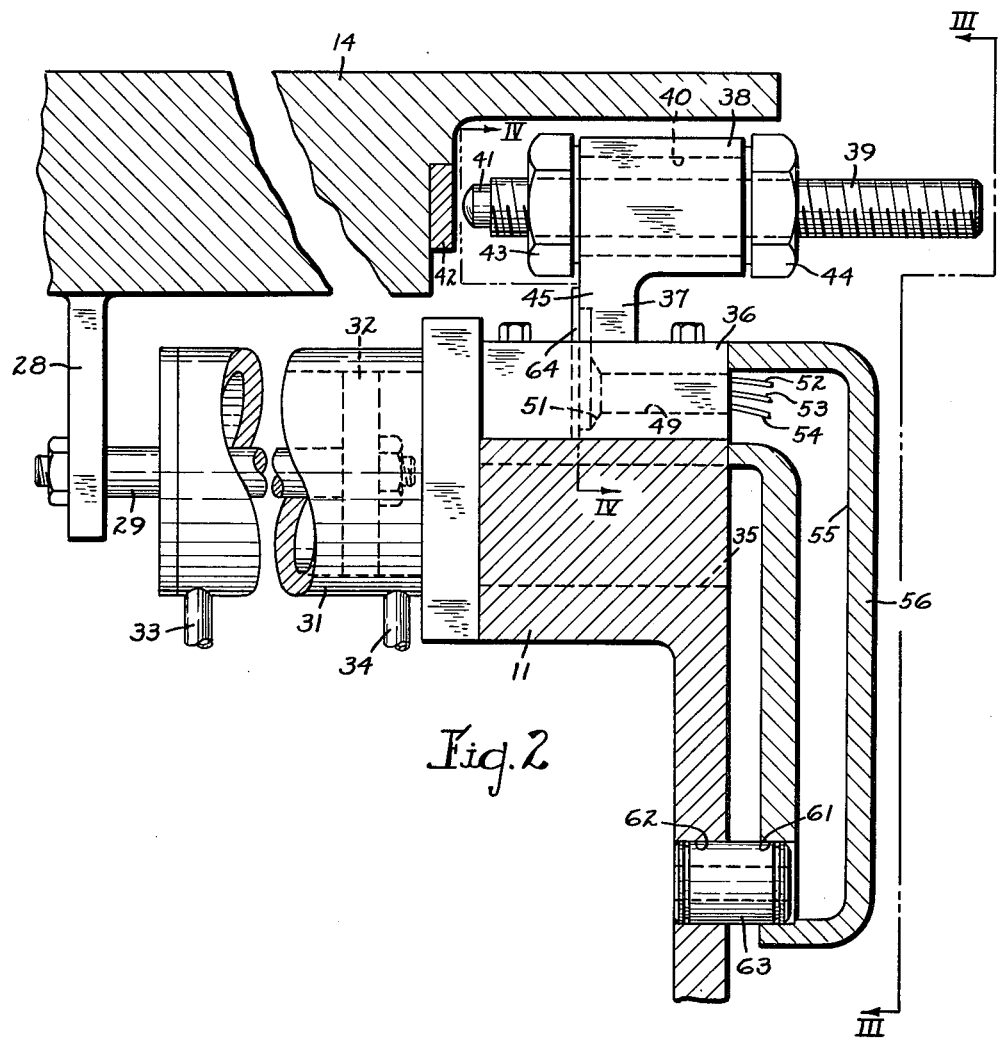
Figure 5:
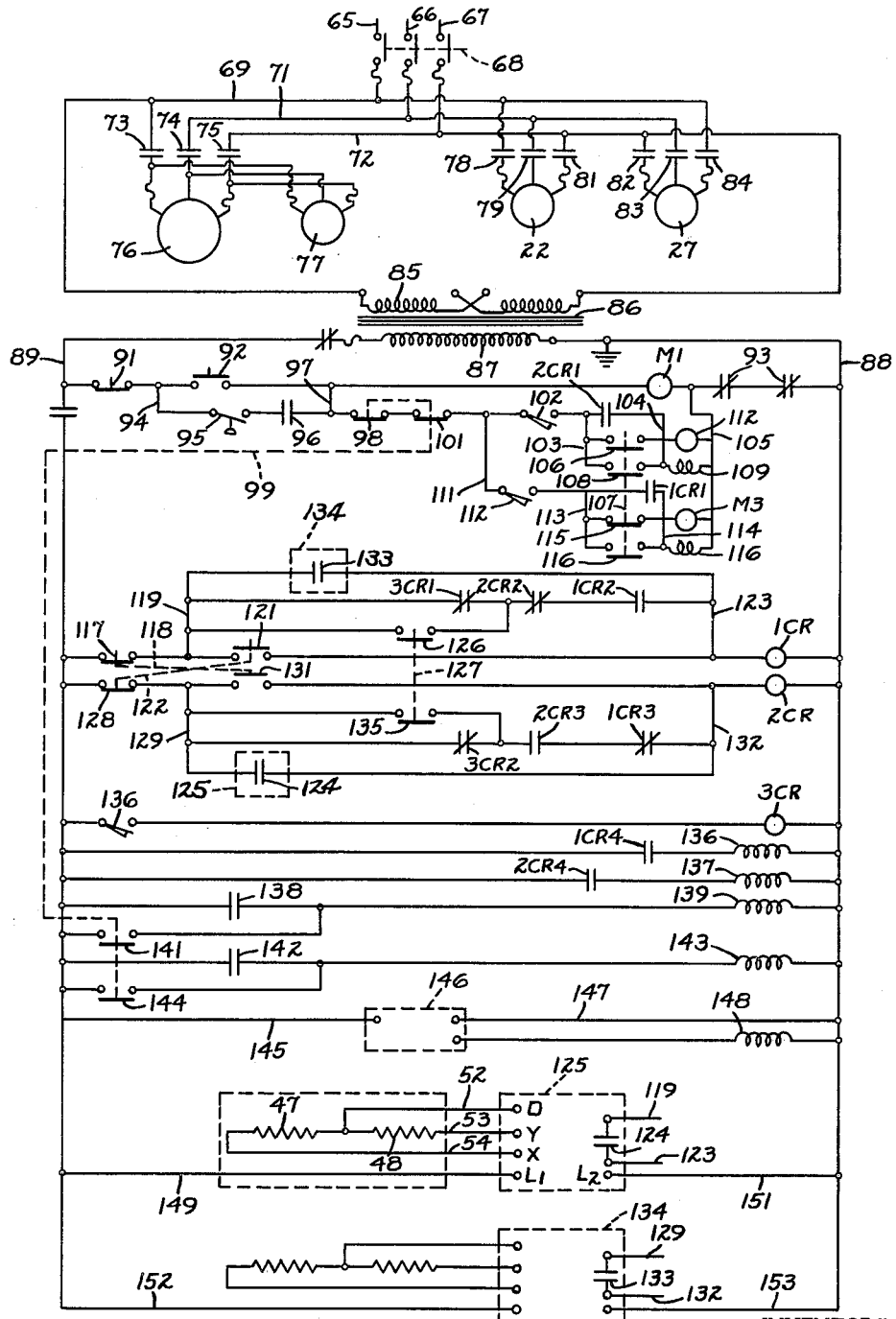

The character of the invention, however, may be best understood by reference to one of its structural forms as illustrated by the accompanying drawings in which:

FIG. 1 is a perspective view of a machine tool embodying the principles of the present invention, FIG. 2 is a sectional view considerably enlarged of a portion of the machine tool taken on the line II—II of FIG. 1, FIG. 3 is an end view of the apparatus shown in FIG. 2 taken on the line III—III, FIG. 4 is a vertical sectional view of the apparatus taken on the line IV—IV of FIG. 2, FIG. 5 is a somewhat schematic view of certain electrical apparatus of the invention, and FIG. 6 is a schematic view of other electrical apparatus forming part of the invention.

Referring first to FIG. 1, which shows the general features of the invention, the machine tool, indicated generally by the reference numeral 10, is shown as a horizontal boring machine. The machine tool is provided with a base 11 on one end of which is mounted a tool holder 12 and at the other end of which is mounted a tool holder 13. The upper portion of the base 11 is provided with rails along which is slidable a work table 14, the work table having a slot 15 on which a workpiece (not shown) is to be mounted. The tool holder 12 is shown as consisting of a bridge-like table 16 under which the work table 14 is slidable. On the upper surface of the table 16 is mounted a tool head 17 having a rotatable spindle 18 on which a boring tool 19 is mounted. Also mounted on the top surface of the table 16 is a bridge-like superstructure 21 on which is mounted a tool head motor 22 connected by suitable belting 23 to the tool head for the rotation of the spindle 18. The tool holder 13 is similar to the tool holder 12 and is provided with a table 24 on which is mounted a tool head spindle (not shown) and boring tool 25. Overlying the table 24 is a superstructure 26 carrying the tool head motor 27, which is connected to the tool head for the rotation of the tool 25.

Referring now to FIG. 2, it can be seen that the table 14 has an abutment 28 which is connected to the piston rod 29 of a hydraulic linear actuator such as a cylinder 31, which has a piston 32 slidable therein. Extending from one end of the cylinder 31 is a conduit 33 and from the other end a conduit 34, these conduits serving to introduce and remove hydraulic fluid from the cylinder. The other end of the cylinder is attached to the base 11 so that the energization of the cylinder 31 causes movement of the work table 14 relative to the base 11. The base 11 is provided with a deep recess 35 (best shown in FIG. 3) in alignment with the cylinder 31. Across this recess and bolted to the base on either side thereof is a base 36 of an abutment member 37. The abutment member is provided at its upper end with a head 38 having an axial bore 40 which extends through it. In the bore resides a threaded contact member 39 with a reduced rounded head 41 at the end which extends toward the work table 14. The work table is provided with a hardened metal plate 42 mounted on a vertical surface and adapted to be contacted by the head 41 of the contact member 39. Nuts 43 and 44 are provided on the contact member and serve to lock it in a desired position. The abutment member 37 between the base 36 and the head 38 is provided with an intermediate portion 45 of rectangular cross section which is uniform in cross-sectional area and shape from the base 36 to the head 38. The width dimension (that is to say, the dimension transversely of the movement of the table 14) is considerably greater than the lengthwise dimension, as is evident in the drawings.

In FIG. 4 it can be seen that the face of the intermediate portion and part of the base 36 is formed with a shallow recess 46. On the back wall of this recess is mounted a strain gauge, such as the resistance-type strain gauge 47 and the resistance-type strain gauge 48. As is evident in the drawing, the strain gauge 47 is provided with its lengthwise direction vertical, which is the direction which will produce the greatest change in resistance with strain on the intermediate portion 45 of the abutment member. The other strain gauge 48 is arranged with its long direction horizontal which means that there will be a minimum effect on its resistance due to bending of the abutment member.

In the bottom portion of the recess 46 is a bore 49 extending through the abutment member and provided with a bevel 51 at its entrance. The strain gauges 47 and 48 are connected in series with one another, as is best evident in FIG. 6, and to lines 52, 53, and 54. The lines 52, 53, and 54 pass through the bore 49 and emerge into a hollow passage 55 in a protector member 56. This member is provided with laterally-extending ears 57 and 58 by which it is bolted to the outboard surface of the base 36 of the abutment member. It is provided with a downwardly-extending finger 59 from the lower end of which the passage 55 emerges to provide an exit bore 61. A similar bore 62 is provided through the wall of the base 11 in alignment with the bore 61. Between the bore 61 and 62 extends a tubular junction member 63 which is provided with grooves and O-rings in the portions which lie within the bores 61 and 62 to provide a waterproof seal. The lines 52, 53, and 54 extend through the bore in the member 63 into the hollow portion of the base 11 where they are then connected to control members of the machine, as will be described further hereinafter. A cover 64 is bolted over the recess 46 to make it waterproof and air tight.

Referring next to FIG. 5, which shows the general electric layout of the machine, it can be seen that three lines 65, 66, and 67 are connected through a main switch 68 and suitable fuses to lines 69, 71, and 72. These lines are connected through the contactors 73, 74, and 75, respectively, of the starter M1 and through suitable fuses to a main drive motor 76. These lines are connected through the same contactors and suitable fuses to a coolant motor 77. The lines 69, 71, and 72 are connected through contactors 78, 79, and 81, respectively, and suitable fuses to the left-hand boring head motor 22, the contactors 78, 79, and 81 being part of a starter M2. The lines 69, 71, and 72 are connected to contactors 82, 83, and 84, respectively, and through suitable fuses to the right-hand boring head motor 27, the contactors being controlled by the starter M3. The lines 69 and 72 are connected to opposite ends of the primary coil 85 of a transformer 86 which is provided with a secondary coil 87. One side of the secondary coil 87 is connected to ground and to a main line 88. The other side of the coil is connected through a suitable fuse and through a normally-closed contactor to a main line 89. The main line 89 is connected through a push button stop switch 91 to one side of a push button start switch 92. The other side of the start switch 92 is connected to one side of the coil of the starter M1, the other side of which is connected through a series of normally-closed contactors 93 to the main line 88. These contactors are located close to the starter contactors and coils and are thermally actuated to cut out the motors in case any of the motors draws an excessive amount of current.

A line 94 is connected between the push button stop switch 91 and the push button start switch 92 and is connected to one side of a pressure-actuated lubrication switch 95. The other side of the switch 95 is connected to one side of a normally-open contactor 96 which forms part of the starter M1 and is closed by energization of the coil of the starter M1. The other side of the contactor 96 is connected by a line 97 to a point lying between the start switch 92 and the coil of the starter M1. The other side of the contactor 96 is also connected to one side of a normally-closed contactor 98 forming part of a brake-release switch 99. The other side of the contactor 98 is connected to one side of a normally-closed contactor 101 also forming part of the brake-release switch 99. The other side of the contactor 101 is connected to one side of a left-hand boring head starting switch 102, the other side of which is connected to a line 103. The line 103 is connected to one side of a normally-open contactor 2CR1 which is associated with a relay 2CR. The other side of the contactor 2CR1 is connected to a line 104 which line is connected through the coil of the left-hand boring head starter M2 to a point lying between the coil of the main drive motor starter M1 and the normally-closed overload contactors 93 by a line 105. The line 103 is also connected through a normally-open contactor 106 of a rotary switch 107, the other side of which is connected to the line 104. The line 103 is also connected to a normally-open contactor 108 of the rotary switch 107 to the line 104. A coil 109 is connected from the line 104 to the line 105, this solenoid operating a coolant valve (not shown) for the left-hand tool 19.

A point between the contactor 101 and the left-hand boring head starting switch 102 is connected by a line 111 to one side of the right-hand boring head starting switch 112. The other side of this switch is connected to a line 113 and to one side of a normally-open contactor 1CR1 associated with a relay 1CR. The other side of the contactor 1CR1 is connected to a line 114 which is connected through the coil of the right-hand boring head motor starter M3 to the line 105 and, eventually, through the normally-closed overload contactors 93 to the main line 88. The line 113 is also connected through a normally-closed contactor 115 of the rotary switch 107 to the line 114. Also, the line 113 is connected through a normally-open contactor 116 of the rotary switch 107 to the line 114. In addition, the line 114 is connected through a coil 116 to the line 105, this coil being a solenoid coil for operating a right-hand coolant valve (not shown) for supplying coolant to the right-hand tool 25.

The line 89 is connected to one side of a normally-closed contactor 117 of a table left switch 118. The other side of the contactor 117 is connected to a line 119 and to one side of a normally-open contactor 121 of a table right switch 122. The other side of the contactor 121 is connected to a line 123 and through the coil of the relay 1CR to the main line 88. The line 119 is connected through a normally-open contactor 124 forming part of a control apparatus 125, as will be more fully described hereinafter, to the line 123. The line 119 is connected to one side of a normally-closed contactor 3CR1 forming part of a relay 3CR. The other side of the contactor 3CR1 is connected to a normally-closed contactor 2CR2 forming part of the relay 2CR. The other side of this last-named contactor is connected through a normally-open contactor 1CR2 associated with the relay 1CR, the other side of which is connected to the line 123. The line 119 is connected to one side of a normally-open contactor 126 forming part of a switch 127, the other side of which is connected to a point between the normally-closed contactors 3CR1 and 2CR2.

The line 89 is also connected through a normally-closed contactor 128 of the table right switch 122 to a line 129 and also to one side of a normally-open contactor 131 forming part of the table left switch 118. The other side of the contactor 131 is connected to a line 132 and also through the coil of the relay 2CR to the main line 88. The line 129 is connected through a normally-open contactor 133 associated with a right-hand control apparatus 134, which will be described more fully hereinafter, to the line 132. The line 129 is also connected to a normally-closed contactor 3CR2 associated with the relay 3CR and through a normally-open contactor 2CR3 associated with the relay 2CR and through a normally-closed contactor 1CR3 associated with the relay 1CR to the line 132. In addition, the line 129 is connected through a normally-open contactor 135 forming part of the switch 127 to a point midway between the contactor 3CR2 and the contactor 2CR3.

The line 89 is also connected through a limit switch 136 and through the coil of the relay 3CR to the main line 88. The line 89 is also connected through a normally-open contactor 1CR4 associated with the relay 1CR and through a solenoid coil 136 to the main line 88. The coil 136 operates a spring-center-type pilot valve (not shown) and moves the plunger to the right, controlling fluid flowing through the conduits 33 and 34 to the main feed cylinder 31. The main line 89 is also connected to a normally-open contactor 2CR4 forming part of the relay 2CR and through a coil 137 to the main line 88; the coil 137 is a solenoid which operates the spring-center pilot valve mentioned above and moves it to the left to send oil through the conduits 33 and 34 and operate the cylinder 31 in the opposite or left-hand direction. The main line 89 is connected through a contactor 138 which is operated by the coil of the starter M2 and through a coil 139 to the main line 88; the coil 139 operates a brake associated with the left-hand boring head motor 22. The line 89 operates through a normally-open contactor 141 associated with the brake release switch 99, the other side of which is connected to a point between the contactor 138 and the coil 139. The main line 89 is connected through a normally-open contactor 142 operated by the coil of the starter M3 of the right-hand boring head motor 27 and through a coil 143 to the main line 88; the coil 143 is a solenoid coil which operates a brake associated with the right-hand boring head motor 127. In addition, the main line 89 is connected to a normally-open contactor 144 associated with the brake release switch 99 to a point between the contactor 142 and the coil 143.

The main line 89 is connected by a line 145 to an input binding post of a lubrication timer 146, one output binding post of which is connected by a line 147 to the main line 88 and the other binding post of which is connected through a coil 148 to the main line 88, the coil 148 acting as a solenoid to open a valve which release lubricant into the bearings of the machine. The main line 89 is connected by a line 149 to a binding post L1 of the control apparatus 125 which, as has been described above, includes the normally-open contactor 124 which is connected to the line 119 and the line 123. Another binding post L2 is connected by a line 151 to the other main line 88. As is evident in the drawing, the strain gauges 47 and 48 are connected by lines 52, 53, and 54 to binding posts D, Y, and X of the control apparatus 125. The control apparatus 134 is also connected to the main line 89 by a line 152 and to the main line 88 by a line 153, it being evident that the control apparatus includes a normally-open contactor 133 which is attached to the lines 129 and 132. In other respects, the strain gauges and the control apparatus associated with the control apparatus 134 are similar to that which will be described below in connection with the strain gauges 47, 48, and the control apparatus 125.

Referring now to FIG. 6, which shows the construction of the control apparatus 125, it can be seen that the binding posts L1 and L2 are connected to the opposite ends of a primary coil 154 of a transformer 155. This transformer is provided with several secondary coils 156, 157, 158, 159, and 161. One side of the coil 161 is connected by a line 162 to the binding post Y which, in turn, is connected by the line 53 to one side of the strain gauge 48. The other side of the coil 161 is connected by a line 163 through a resistor 164 to the binding post X which, it will be recalled, is connected to the outboard end of the vertical strain gauge 47. The coil 159 is connected on one end to a rectifier 165 which is oriented to allow current to flow away from that end only; across the coil is mounted a capacitor 166. Another capacitor 167 is connected across the coil 159 and a resistor 168 is connected between two legs of capacitors to form a filter. The resistor side of the capacitors 166 and 167 is connected through a resistor 169, through a line 171 to the emitter of a transistor 172 of the 2N217 type. The other side of the capacitors 166 and 167 are connected by a line 173 to the base of the transistor 172 and also through 216 and a resistor 174 to the binding post C. The coils 157 and 158 are connected together and connected by a line 175 to the collector of a transistor 176 which is of the 2N217 type. The other end of the secondary coil 158 is connected through a rectifier 177 by a line 178 to one side of a resistor 179, the other side of which is connected by a line 181 to the base of a transistor 182 of the 2N217 type. The line 175 and the collector of the transistor 175 are connected by a line 183 to the collector of the transistor 172. The other end of the secondary coil 157 is connected through a rectifier 184 by a line 185 to one side of a resistor 186.

One end of the coil 156 is connected to a rectifier 187 and to a line 188 which, eventually, connects to the other side of the resistor 186. The other end of the coil 156 is connected by a line 189 to one side of a resistor 191, the other side of which is connected to the collector of the transistor 182, which collector is also connected by a line 192 to the base of a transistor 193 which is of the 2N591 type. The emitter of the transistor 193 is connected by a line 194 to one side of a resistor 195, the other side of which is connected to the line 189 between the resistor 193 and the coil 156. The line 194 is connected also to one side of a resistor 196, the other side of which is connected to the line 188 between the rectifier 187 and the resistor 186. The line 188 adjacent the rectifier 187 is connected to one side of a capacitor 197, the other side of which is connected to one end of a coil 198 which forms part of the relay which operates the normally-open contactor 124 which serves to connect the lines 119 and 123, on occasion. The other side of the coil 198 is connected by a line 199 to the collector of the transistor 193. A rectifier 201 is connected across the coil 198 to permit flow of current toward the line 199 only. The line 199 is connected to one side of a resistor 202, the other side of which is connected to a variable resistor 203. The other side of the resistor 203 is connected to the line 181 and to the base of the transistor 182. The line 181 is connected by a line 204 to one side of a resistor 205, the other side of which is connected to the base of the transistor 172. The base of the transistor 172 is connected to a rectifier 206, the other side of which is connected to the base of the transistor 176 and also to a line 207 leading to the binding post D which, as has been described above, is connected to the common point between the strain gauges 47 and 48. The line 178 adjacent the resistor 179 is connected by a capacitor 208 to a line 209 connected to the emitter of the transistor 176. The other side of the resistor 179 is connected by a capacitor 211 to the line 209 to form a filter. The line 209 is also connected to one end of a resistor 212, the other end of which is connected to the line 181 and to the said other side of the resistor 179. The line 209 is connected to one side of a resistor 213, the other side of which is connected to the line 188; a capacitor 214 is connected across the resistor 213. The resistor 215 is connected on one end to the line 188 adjacent the resistor 186 and at the other end to a line 216 connecting the resistor 174 to the base of the transistor 172. The binding post C is connected to the binding post Y by a resistor 217, while the binding post C is connected to the binding post X by a resistor 218, these last-named resistors operating with the resistances in the strain gauges 47 and 48 to form a bridge circuit.

The operation of the invention will now be readily understood in view of the above description. The workpiece will be attached to the worktable 14 by means of the slot 15. By moving the worktable 14 back and forth it is possible first, to have the tool 19 operate on the workpiece and, then, to have the tool 25 operate on the other side of the workpiece. Now, when the worktable 14 moves to the right, it eventually occupies the position shown in FIG. 2 while oil is being introduced through the conduit 33 and removed through the conduit 34 to move the table 14 toward the head 41 of the abutment member 37. Eventually, the hardened metal plate 42 of the table 14 contacts the contact member 39 on the head 41. Assuming a predetermined hydraulic pressure behind the piston 33, the worktable 14 will not come to a complete stop; instead, it will push against the abutment member 37 with a predetermined force. This will bend the intermediate portion 45 of the abutment member to the right in FIG. 2; the bending in this way will generate a certain signal in the strain gauges 47 and 48, and, particularly, the resistance in the vertical strain gauge 47 will change, the resistance in the strain gauge 48 remaining more or less the same, but varying with temperature. This change of resistance operates in the bridge circuit formed between the strain gauges 47 and 48 and the resistors 217 and 218 to indicate a given unbalance of the bridge circuit in the control apparatus 125. When a predetermined unbalance is established, the normally-open contactor 124 will be closed by energization of the relay coil 198 so that, referring to FIG. 5, it can be seen that current will pass from the main line 89 through the line 119, through the contactor 124, through the line 123, and through the coil of the relay 1CR to the main line 88. The energization of the relay 1CR will close the normally-open contactor 1CR4 and cause current to pass from the main line 89 to the main line 88 through the solenoid coil 136. This will have the effect of moving the aforementioned pilot valve to the right to cause reversal of oil to the conduits 33 and 34. This reversal will cause pressure oil to appear behind the piston 32 through the conduit 34 and cause the piston to squeeze oil out through the conduit 33. This, in turn, will cause the worktable 14 to reverse its direction and move toward a center position. If the workpiece is to be operated on by the tool 19, the worktable 14 will continue to the left until, at the left hand end of its motion (while the tool 19 is operating on the workpiece), the left hand end of the table will, eventually, reach a point where it strikes an abutment member carrying strain gauges and these gauges will operate through the control apparatus 134 to close the normally-open contactor 133 to allow current to flow from the line 129 to the line 132 and through the coil of the relay 2CR. The net affect of this is to close the normally-open contactor 2CR4 and cause current to pass from the main line 89 to the main line 88 through the solenoid coil 137. This coil has the effect of shifting the pilot valve in the other direction to cause pressure oil to appear in the conduit 33 and to permit oil to discharge through the conduit 34, so that the motion of the table will be reversed.

Some of the aspects of the general electrical circuitry should be mentioned. For instance, the lubrication solenoid 148 is energized at a fixed, pre-determined time after the main switch 68 is closed. Normally, the boring head motors 22 and 27 would not both rotates at the same time; only one would rotate in any given time, depending on which of the relays 1CR and 2CR is energized. The effect of energizing the relay 1CR is to close the normally-open contactor 2CR1 and cause energization of the motor starter M2. This causes the left-hand boring head 22 to rotate, rotating its spindle 18 and the tool 19 with it. It also causes the closing of the normally-open contactor 138 and the energization of the solenoid coil 139 which causes the left-hand boring head motor brake to be released, so that the boring head motor 22 is free to rotate the spindle. The switch 107 which operates the contactors 106, 108, 115, and 116 is used for setting-up purposes to rotate selectively the motors 22 and 27, irrespective of the condition of the relays, since the boring head motors 22 and 27 will not rotate unless the respective limit switch 102 or 112 is closed also. This depends on the position of the worktable 14 which serves to strike these limit switches and close them at proper positions of movement of the worktable back and forth.

To start a complete cycle of boring at both ends of the base 11, starting with the worktable 14 in center position, the operator presses the "Table Right" push button 128, energizing the relay 1CR. This closes the normally-open contactor 1CR4 and energizes the solenoid coil 136. This operates through the pilot valve to send the table to the "right." For part of the traverse, the workpiece and the tool do not touch one another and rapid traverse would normally be used. Eventually, the tool 25 engages the workpiece and starts the boring operation. This takes place until the worktable 14 reaches the right-hand position so that the strain gauge at that end is engaged and operates the control apparatus 125 to close the normally-open contactor M4 to energize the relay 2CR. This closes the normally-open contactor 2CR4 and energizes the solenoid 137 sending the table to the left. Eventually, the table reaches its center position and this closes the limit switch 136 which energizes the relay 3CR. That opens the normally-closed contactor 3CR2 which, when it opens, de-energizes the relay coil 2CR and stops the table.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent, is:

1. A machine tool, comprising
   (a) a base,
   (b) a first member consisting of a motor-driven spindle for carrying a boring tool mounted on the base and adapted to carry a boring tool,
   (c) a second member consisting of a worktable mounted on rails on the base for sliding movement over the base and adapted to carry a workpiece,
   (d) a hydraulic cylinder connecting the first member to the second member for bringing about relative feeding movement between the first and second members to introduce the boring tool to the workpiece,
   (e) an abutment mounted on one of the said members and extending into the path of the other member, the abutment having a substantially lesser dimension in the direction of the relative movement between the members than in the direction transverse thereof, the abutment being subject to bending after engagement by the said other member, and
   (f) a transducer consisting of a strain gage of the resistance type wherein the resistance varies in accordance with the strain placed thereon, the transducer consisting of two resistance-type strain gages mounted close together and having their directional characteristics at a right angle, the transducer being mounted on the said abutments and connected to the hydraulic cylinder to control the cylinder in accordance with the amount of bending of the abutment.

2. A machine tool, comprising
   (a) a base,
   (b) a first member mounted on the base and adapted to carry a tool,
   (c) a second member mounted on the base and adapted to carry a workpiece,
   (d) means bringing about relative feeding movement between the first and the second member to introduce the tool to the workpiece,
   (e) an abutment mounted on one of the said members and extending into the path of other member, the abutment being subject to bending after engagement by the said other member,
   (f) a transducer consisting of a strain gage of the resistance type, wherein the resistance varies in accordance with the strain placed thereon, mounted on the said abutment and connected to the said means to control the said means in accordance with the amount of bending of the abutment.

3. A machine tool as recited in claim 2, wherein the abutment has a substantially lesser dimension in the direction of the relative movement between the members and in the direction transverse thereof.

4. A machine tool as recited in claim 2, wherein the transducer consists of two resistant-type strain gages mounted close together and having their directional characteristics at a right angle.

References Cited by the Examiner
UNITED STATES PATENTS

| | | |
|---|---|---|
| 1,946,902 | 2/1934 | Ferris. |
| 2,379,370 | 6/1945 | Metz. |
| 2,498,881 | 2/1950 | Eldridge _____ 73—88.5 X |
| 2,581,060 | 1/1952 | Wold. |
| 2,592,223 | 4/1952 | Williams _____ 338—2 |
| 2,754,567 | 7/1956 | Crane _____ 192—150 X |

WILLIAM W. DYER, JR., *Primary Examiner.*